July 21, 1942.  W. D. JEFFERS  2,290,433
FISHING LURE
Filed March 1, 1941

Inventor
WILLIAM D. JEFFERS

By W. S. McDowell
Attorney

Patented July 21, 1942

2,290,433

UNITED STATES PATENT OFFICE 2,290,433

FISHING LURE

William D. Jeffers, Columbus, Ohio

Application March 1, 1941, Serial No. 381,343

7 Claims. (Cl. 43—42)

This invention relates to lures or artificial bait for use in attracting and catching fish, and the primary object resides in the provision of an improved lure which closely simulates the appearance and natural action or movements, when in the water, of live bait.

Another object of the invention resides in the provision of an artificial fishing lure wherein the elongated body of the lure is composed of a readily flexible material, such as rubber, molded to resemble the appearance of live bait, the head end of the body having molded in its under side the hook element of the lure, while the opposite end thereof is provided with an enlarged tail or agitator composed preferably of a transparent material, the associated fishing line being connected with the hook element and trained along the under side of the lure to pass through a slot provided in the enlarged tail or agitator, whereby when the lure is being used, light jerks applied to the line will cause a flexing of the body of the lure longitudinally thereof to very closely approximate the natural swimming movements of certain types of natural bait.

A further object resides in a lure of simple and inexpensive construction and one possessing marked effectiveness for the purposes set forth.

Figure 1:
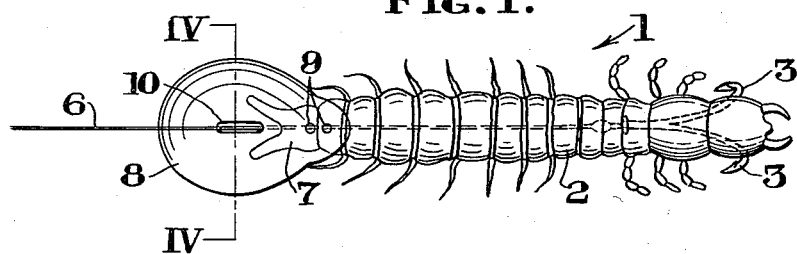
Fig. 1 is a plan view of a fishing lure formed in accordance with the present invention.

Referring to the drawing, the numeral 1 designates the improved fishing lure in its entirety. The lure herein selected for illustration comprises a narrow elongated body 2, comparatively thin in transverse cross section and formed from a readily flexible material, such as molded uncured rubber, or other suitable materials having analogous properties. Further, the particular lure illustrated is molded to closely simulate the appearance of hellgramite, although it will be understood that the body 2 may be molded or otherwise formed to resemble the natural appearance of other insects, minnows, crawfish or other live things used as bait by anglers. It has been found, however, that the hellgramite type in the catching of bass and other game fish is the most effective.

Adjacent to its forward or head end, the body 2 has molded thereto and projecting from its nether side one or more hook elements, for instance of the type indicated at 3 in the drawing. The eye portion 4 of this hook element has attached thereto a swivel 5 to which is connected the distal extremity of a fishing line 6.

One of the important features of the present invention consists in providing the tail portion 7 of the body 2 with an enlargement or agitator 8. In the specific embodiment of the invention disclosed, this agitator comprises a molded body of concavo-convex form having a generally elliptical marginal configuration. It is preferred that the agitator should be composed of a substantially transparent material, such as certain grades of rubber, or one of the so-called plastics, so that the agitator will not be visible to fish when the lure is in use. To attach the agitator to the tail portion of the body 2, a pair of rivets, indicated at 9, may be employed. It will be appreciated that the agitator 8 may be integrally formed with the body 2, provided that the tail portion 8 is substantially transparent while the body 2 is relatively opaque.

Figure 2:
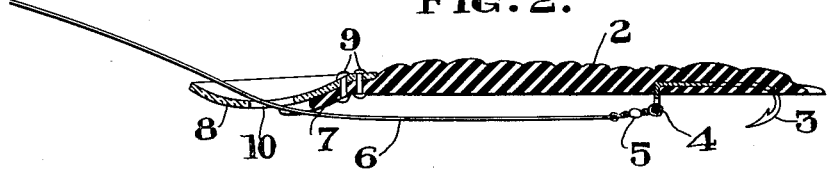
Fig. 2 is a vertical longitudinal sectional view taken through the same.

Another feature of the invention resides in the provision of an elongated opening or slot 10 in the agitator 8. As shown in Fig. 2, the fishing line 6 extends from the swivel 5 along the under side of the lure and is trained through the narrow but elongated opening 10. It is preferable that this opening should be narrow in order to secure the desired longitudinal flexure of the lure when it is in use and to preclude undesired lateral or transverse movement thereof.

Figure 3:
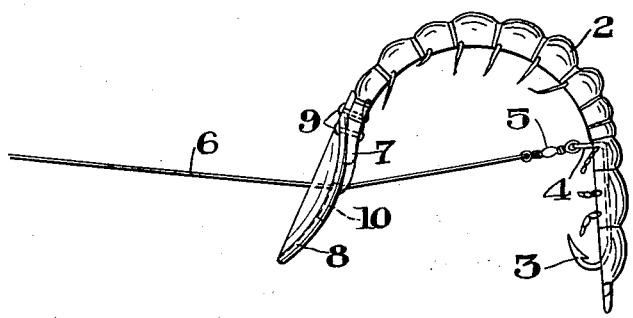
Fig. 3 is a side elevational view disclosing the lure in its flexed state.
Figure 4:
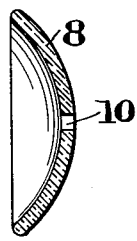
Fig. 4 is a transverse sectional view on the line IV—IV of Fig. 1.

In the use of the lure, the same is attached to the line 6, as disclosed in Fig. 2, and is cast by the angler into the water. By applying a series of light jerks to the line 6, the lure is flexed or bent longitudinally, after the manner depicted in Fig. 3, so that it will be bent upon itself to simulate the swimming movements of hellgramite. This flexing in the longitudinal plane is made possible by the inclusion of the web-like agitator 8, which is so formed and disposed that when tension is applied to the line 6, water pressure on the surface of the agitator will tend to resist change in the position of the lure, thereby causing the forces applied by the tightening of the line to be applied to the forward or head end of the lure to bend the latter longitudinally, lateral movement being precluded by the narrow slot 10. The animated motion thus imparted to the lure is remarkably life like and has a very distinct bearing on the effectiveness of the lure in the catching of various types of fish, particularly game fish.

What is claimed as new and patentable is:

1. An angler's lure comprising a relatively narrow elongated body composed of a flexible resilient material, a hook element carried at one end of said body, an agitator composed of a substantially transparent material provided at the opposite end of said body, and a narrow elongated opening provided in said agitator and through which a fishing line connected with the hook element is adapted to be trained.

2. An angler's lure comprising a relatively narrow elongated body composed of a flexible resilient material, a hook element carried at one end of said body, an agitator provided at the opposite end of said body, and a narrow elongated opening provided in said agitator and through which a fishing line connected with the hook element is adapted to be trained, the portion of the line between said hook and said agitator being disposed exteriorly of said body.

3. An angler's lure comprising a relatively narrow elongated body composed of a flexible resilient material, a hook element carried at one end of said body, an agitator secured to the opposite end of said body, said agitator being formed from a substantially transparent material, and a relatively narrow elongated opening provided in said agitator and through which a fishing line connected with said hook element is adapted to be trained.

4. An angler's lure comprising an elongated relatively narrow body formed from a flexible resilient material, said body being molded to simulate the appearance of hellgramite, a hook element carried by the forward end of said body, and an enlarged tail extension provided on the other end of said body, said tail extension being formed from a substantially transparent material and having an opening provided therein through which a fishing line connected with said hook element is trained.

5. An angler's lure comprising an elongated flexible body, hook means secured to said body adjacent to one end thereof, and means carried by the opposite end of said body to resist movement thereof through water, said last-mentioned means having an opening for the slidable reception of a line leading from said hook, the portion of the line between said hook and movement resisting means being disposed exteriorly of said body.

6. An angler's lure comprising an elongated flexible body shaped to simulate the appearance of a thing attractive to fish, hook means embedded in said body adjacent to one end thereof, a spoon-shaped element carried by the opposite end of said body, said element having an opening therein for slidable reception of a line leading from said hook.

7. An angler's lure comprising a flexible body, hook means secured to said body adjacent to one end thereof, and means carried by the opposite end of said body to resist movement thereof through water, said movement resisting means having an opening for the slidable reception of a line leading from said hook, movement of said line through said opening serving to flex said body between said hook and said movement resisting means.

WILLIAM D. JEFFERS.